Jan. 7, 1936.　　　　J. GOLDMAN　　　　2,027,162
LANDING APPARATUS FOR AIRPLANES
Filed July 2, 1935　　　　2 Sheets-Sheet 1
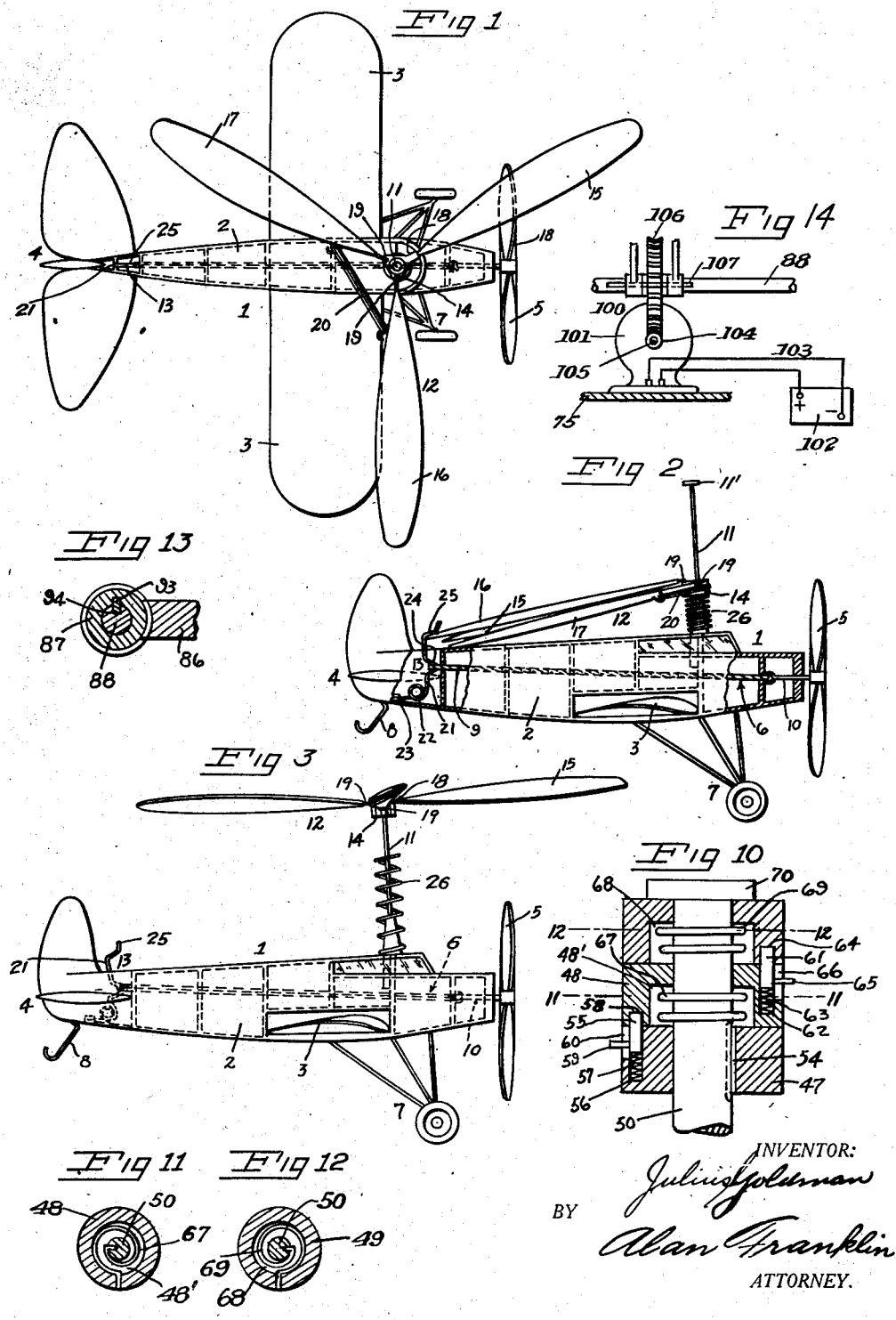

Jan. 7, 1936.  J. GOLDMAN  2,027,162
LANDING APPARATUS FOR AIRPLANES
Filed July 2, 1935  2 Sheets-Sheet 2
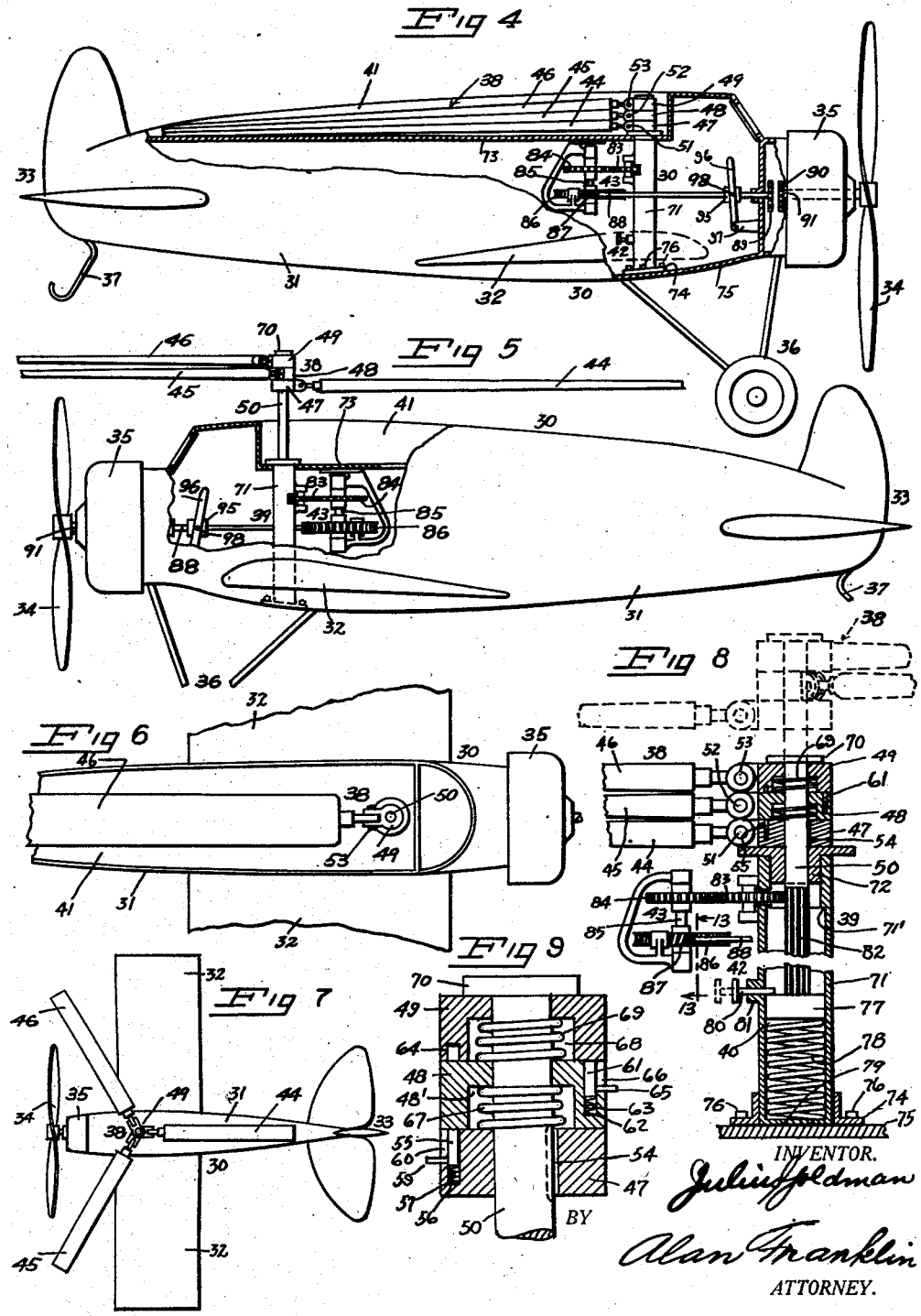
INVENTOR.
Julius Goldman
BY
Alan Franklin
ATTORNEY.

Patented Jan. 7, 1936

2,027,162

UNITED STATES PATENT OFFICE 2,027,162

LANDING APPARATUS FOR AIRPLANES

Julius Goldman, Los Angeles, Calif.

Application July 2, 1935, Serial No. 29,483

5 Claims. (Cl. 46—76)

This invention relates to landing apparatus for airplanes, and the general object thereof is to provide a landing apparatus, including a rotor which is normally folded up and positioned upon or within the fuselage of the plane, and which may be released and caused to open up and revolve to land the plane safely.

Another object is to provide a toy airplane constructed and arranged with a winding motor to be wound up to drive the propeller of the plane, and including a landing rotor which is normally folded up and positioned upon or within the fuselage of the plane and which is automatically released by means actuated by the motor when the motor runs down, whereupon said landing rotor is caused to open up and revolve so as to land the plane safely.

A further object is to provide a landing apparatus for airplanes in which a landing rotor may be brought into operation and allowed to rotate freely or driven by power to land an airplane safely.

Other objects and advantages will appear hereinafter as the specification progresses.

The invention is illustrated in the annexed drawings which form a part of this specification and in which, Fig. 1 is a plan view of a toy airplane embodying my invention and showing my landing rotor unfolded into operative position for landing an airplane.

Fig. 2 is a side elevation of the airplane and my invention as illustrated in Fig. 1, but my landing rotor folded up and secured in position upon the fuselage of the plane for normal flying of the plane.

Fig. 3 is a side elevation of an airplane and my invention as shown in Fig. 1, showing my landing rotor released from the fuselage and unfolded and elevated above the fuselage of the plane into position for landing the plane.

Fig. 4 is a side elevation, partly broken away, of an airplane embodying another form of my invention, showing the landing rotor folded up within a pocket in the top of the fuselage of the plane for normal flying of the plane.

Fig. 5 is a view like Fig. 4, except that the landing rotor is shown released, unfolded and elevated above the fuselage of the plane into operative position for landing the plane.

Fig. 6 is a fragmentary plan view of Fig. 4.

Fig. 7 is a plane view, on a small scale, of Fig. 5.

Fig. 8 is a vertical longitudinal section of my landing apparatus, as illustrated in Figs. 4 to 7 inclusive, showing in full lines the wings of the rotor folded up and in their lowered position and locked in such position, and showing in dotted lines the wings of the rotor unfolded and in their elevated and operative position.

Fig. 9 is a fragmentary vertical longitudinal section of my landing rotor on an enlarged scale, illustrating the locking means for locking the wings of the rotor in spaced operative relation and showing said locking means in unlocked position.

Fig. 10 is a view like Fig. 9, except that the wing locking means is shown in locked position.

Fig. 11 is a horizontal section of one of the rotor wing hubs, taken on line 11—11 of Fig. 9.

Fig. 12 is a horizontal section of another rotor wing hub, taken on line 12—12 of Fig. 9.

Fig. 13 is a vertical cross section of the power driving means for my landing rotor, taken on line 13—13 of Fig. 8.

Fig. 14 is an elevation of an independent power driving means for the rotor.

Referring more particularly to Figs. 1 to 3 of the drawings, in which corresponding parts are designated by the same reference characters, 1 indicates a toy airplane, including generally a fuselage 2, wings 3, empennage 4, propeller 5, motor 6 for driving said propeller, landing carriage 7, and rear support 8. The motor 6 may comprise a plurality of elastic bands 9 connected at their forward ends to the propeller shaft 10 and connected at their rear ends as will be hereinafter described.

My invention, as applied to a toy airplane as shown in Figs. 1 to 3 inclusive, comprises a pole 11, upstanding from the top of the fuselage 2 near the forward end thereof, a novel foldable landing rotor 12 turnably and slidably mounted on said pole, and rotor holding and releasing means 13 for normally holding said rotor in folded position to the fuselage 2 and for automatically releasing said rotor when the power of the motor 6 is about spent, as will be hereinafter more fully set forth. The pole 11 has a cap 11' on its upper end. The landing rotor 12 comprises a hub 14 and a plurality of blades 15, 16 and 17, the blade 15 being rigidly connected to said hub by a rigid connection 18 and the blades 16 and 17 being hingedly connected to said hub by hinge connections 19, so that said blades may be swung respectively, one over and the other under said rigidly connected blade 15. The blades 16 and 17 are connected together near their inner ends by an elastic band 20, which band is expanded over the hub 14 when the said blades are respectively swung over and under the blade 15, and said band contracts and swings the blades 16 and 17 into their spaced operative relation when the rotor 12 is released from the rotor holding means 13, as will be hereinafter more fully set forth. The rotor holding and automatic releasing means 13 includes a spring arm 21, formed with a coil 22 near its lower end, and its lower end secured to the fuselage 2 at 23, while said arm extends upwardly through said fuselage and is bent intermediate its ends into a V-shaped connecting member 24 and bent at its upper end above the fuselage, forwardly into a latch 25, the rear ends of the elastic bands 9 of motor 6 being connected to said spring arm 21 by said connecting member 24, and said latch being constructed and arranged to extend over the rear end and engage the upper surface of the rotor blade 16, under the influence of the elastic bands 9 of motor 6 while said motor is wound up, and when said blade 16 is swung over the blade 15 and the blade 17 is swung under the blade 15, and the rotor 12 is in its lowermost position on the pole 11, whereby the rotor 12 is releasably held in folded position to the fuselage 2. A spring 26 surrounds the pole 11 under the rotor 12 and rests upon the top of the fuselage 2.

The operation of my invention as illustrated in Figs. 1 to 3 inclusive is as follows:

The blades 16 and 17 of the rotor 12 are swung on their hinges 19 against the tension of the elastic band 20, which is drawn over the hub 14 until the blade 17 rests under the blade 15 and the blade 16 rests over the blade 15, and said blades all rest directly over the fuselage 2, while the rotor 12 is lowered on the pole 11 compressing the spring 26. The propeller 5 is then turned and the motor 6 wound up by twisting the elastic bands 9 of said motor together, which shortens the length of said bands and draws the spring arm 21 forwardly until the arm latch 25 is drawn over the upper side of the outer end of the blade 16, whereby the rotor 12 is releasably held in its lowered and folded position on the fuselage 2. The airplane 1 is then thrown into the air, and as the propeller 5 is released it is rotated by the unwinding of the elastic bands 9 of the motor 6, which causes the plane to fly, until said bands are unwound, during which operation the spring coil 22 of lever 21 swings said lever rearwardly until the latch 25 escapes the outer end of the rotor blade 16, whereupon the rotor blades 16 and 17 are respectively swung from over and from under the blade 15, by the spring 20, into operative position, as shown in Fig. 1, while the resistance of the air against said blades rotates the rotor 12 and causes the rotor under the influence of the spring 26 to rise on the pole 11 until the hub of the rotor engages the cap 11' on the upper end of the pole, and the rotor continues to rotate at the top of said pole and causes the plane 1 to descend slowly and land safely.

Referring with particularity to Figs. 4 to 13 of the drawings, 30 designates an airplane, including a fuselage 31, wings 32, empennage 33, propeller 34, motor 35, landing carriage 36 and rear end support 37. The airplane 30 may be either in the form of a conventional airplane or in the form of a toy. When my invention is embodied in a conventional airplane the motor 35 will be the usual gas engine, and when embodied in the form of a toy airplane the motor 35 may be in the form of a clock spring motor or any other suitable form of motor.

My invention when applied to a conventional airplane, as illustrated in Figs. 4 to 13 inclusive, comprises a novel foldable landing rotor 38, a mounting 39 for said rotor, means 40 for projecting said rotor above the fuselage 31 and maintaining said rotor in said projected position, a pocket 41 in the top of said fuselage to receive the rotor 38 with its wings folded, one-above-the-other, during normal use of the plane, and means 42 for holding the rotor with its wings folded and while in its lowered position within the fuselage pocket 41, and driving means 43 for said rotor.

The landing rotor 38 may be of any suitable form; it being shown in the form of a gyroplane, comprising a plurality of wings 44, 45 and 46, hubs 47, 48 and 49, and a shaft 50 on which said hubs are mounted, said wings being pivoted at their inner ends to said hubs by horizontal pivots 51, 52 and 53 respectively, so that said wings may swing up or down from said hubs respectively. The hub 47 is keyed to the shaft 50 by a key 54 and a lock pin 55 is slidably mounted in a socket 56 in the upper side of said hub, which pin is pressed upwardly by a spring 57 resting in said socket below said pin, there being a socket 58 in the lower side of the hub 48 to receive the upper portion of said pin, when the wing 45 is in spaced operative relation to the wing 44, as illustrated in Fig. 10 of the drawings. A short finger piece 59 projects outwardly from the lock pin 55 through a slot 60 in the hub 47 for depressing said pin and withdrawing it from the socket 58 in the hub 48, so that the wing 45 may be swung on the shaft 50 with relation to the wing 44. A lock pin 61 is slidably mounted in a socket 62 in the upper side of the hub 48 and said pin is pressed upwardly by a spring 63 resting in the bottom of said socket 62, there being a socket 64 in the lower side of the hub 49 to receive the upper portion of the pin 61, when the wing 46 is in spaced operative relation to the wing 45, as illustrated in Fig. 10 of the drawings. A finger piece 65 projects from the lock pin 61 through a slot 66 in the hub 48 for depressing said lock pin and withdrawing it from the socket 64 in hub 49, so that the wing 46 may be swung on the shaft 50 with relation to the wing 45. The hub 48 is formed with a recess 48' in its under side in which a spring 67 is coiled around the shaft 50, one end of said spring being connected to said shaft and the other end of said spring being secured to said hub, as shown in Fig. 11 of the drawings. The hub 49 is formed with a recess 68 in its under side in which a spring 69 is coiled around the shaft 50, with one end of said spring connected to said shaft and the other end of said spring connected to said hub 49. The shaft 50 is formed with a cap 70 on its upper end which serves as an end thrust bearing against the upper end of the uppermost hub 49 of the wing 46, whereby the hubs of the rotor 38 are prevented from sliding off the upper end of said shaft.

The mounting 39 for the rotor 38 comprises a tubular standard 71 and a bearing 72 fitted in the upper end of said standard, through which the shaft 50 extends and in which said shaft is slidably mounted. The standard 71 is positioned in the forward end of the fuselage 31 on the longitudinal axis of the plane and extends through the upper wall 73 of the fuselage, the lower end or base 74 of said standard resting upon the lower wall or floor 75 of the fuselage, and said base being secured to said floor by bolts 76. The standard 71 is formed with an internal shoulder 71' near its upper end for the purpose hereinafter described.

The projecting means 40 for the rotor 38 comprises a piston 77 on the lower end of the shaft 50, which piston is slidably fitted in the tubular standard 71, and a coil spring 78 in the lower end of said standard, the lower end of said spring resting upon the lower end wall 79 of said standard, and said piston resting upon the upper end of said spring.

The means 42 for holding the rotor 38 in its lowered position with its folded wings within the pocket 41 in the top of the fuselage 31, comprises a pin 80 slidably mounted in a bearing 81 in the standard 71 and extending through the wall of said standard, for engaging the upper side of the piston 77 and holding said piston in its lowered position compressing the spring 78.

The driving means 43 for the rotor 38 comprises an elongated pinion 82 formed on the rotor shaft 50, a gear 83 in mesh with said pinion, a gear 84 secured on a shaft 85 in mesh with said gear 83, a worm gear 86 secured on said shaft 85, a worm 87 secured on a shaft 88 and in mesh with said worm gear, a gear 89 on the forward end of said shaft 88, and a pinion 90 on the rear end of the shaft 91 of the motor 92 of the plane 30. The worm 87 is splined on the shaft 88 by means of a spline 93 secured in said worm and a groove 94 in said shaft, in which groove said spline may slide, so that the shaft 88 may be shifted to cause the gear 89 to mesh with the motor pinion 90, or to unmesh said gear and pinion. A grooved collar 95 is secured on the shaft 88, and an operating lever 96, pivoted at its lower end to a bracket 97 on a wall of the fuselage 31, has a pin 98 engaging the groove of said collar, so that, upon swinging said lever to the right or left, the shaft 88 is shifted to cause the gear 89 to mesh with the gear 90 or to unmesh said gears.

The operation of my invention as illustrated in Figs. 4 to 13 inclusive is as follows:

During normal flight and use of the airplane 30, the wings 44, 45 and 46 of the rotor 38 are folded with the wing 44 under the wing 45 and the wing 46 over the wing 45, the locking pins 55 and 61 being withdrawn from the sockets 58 and 64 respectively, and the rotor 38 lowered into the socket 41 in the top of the fuselage 31, as shown in Fig. 4, and the rotor is held in such lowered position by the engagement of the pin 80 with the upper side of the piston 77, while the gear 89 is out of mesh with the pinion 90, so that the motor 91 will not drive the rotor.

When it is desired to land the plane during flight, the pilot withdraws the pin 80 out of engagement with the piston 77, whereupon the spring 78, acting upon said piston, projects the rotor 38 upwardly above the plane until said piston engages the shoulder 71' in the upper end of the standard 71, while the springs 67 and 69 swing the wings 45 and 46 respectively around on the shaft 50, until all of the wings 44, 45 and 46 are positioned equi-distant apart in operative position, as shown in Figs. 5 and 7, in which position the locking pins 55 and 61 spring into the sockets 58 and 64 respectively, under the influence of the springs 57 and 63 respectively and lock the wings 44, 45 and 46 in their spaced operative relation, as illustrated in Fig. 10 of the drawings.

As the plane travels forwardly, the action of the air against the wings 44, 45 and 46 rotates the rotor 38, while the action of said rotating wings upon the air produces sufficient "lift" or resistance to the descent of the plane as to cause the plane to descend slowly and land safely, and within a short distance. In the event that the rotor should stall, or should not rotate rapidly enough to produce sufficient resistance to the descent of the plane, the rotor may be rotated at the desired speed by the motor 91 of the plane, upon shifting the gear 89, by means of the lever 96, into mesh with the motor pinion 90, whereby the motor is enabled to rotate the rotor through the medium of the pinion 90, gear 89, shaft 88, worm 87, worm gear 86, shaft 85, gears 84 and 83, pinion 82 and rotor shaft 50.

The rotor 38 may also be used for lifting the plane off the ground, under the power of the motor 91. This is accomplished by withdrawing the pin 80 from the piston 77 and shifting the gear 89 into mesh with the pinion 90, whereupon the rotor is elevated by the spring 78 and the wings of the rotor swung or unfolded into spaced operative relation, and the rotor is rotated by the motor 91 through the driving mechanism 43, as above described. The rotation of the rotor 38 by the motor at sufficient speed lifts the plane off the ground into the air.

The driving means shown in Fig. 14 of the drawings comprises a motor 101, driven by a storage battery 102 through a circuit 103, a worm 104 on the motor shaft 105, and a worm gear 106 in mesh with said worm 104 and splined on the shaft 88, as indicated at 107, said motor resting on the floor 75 of the fuselage 31.

In this specification and the annexed drawings I disclose my invention in a form which I consider desirable, but I do not limit my invention to such form, because it may be embodied in other forms, and it is to be understood, that in and by the claims of this specification, I intend to cover my invention in whatever form it may be embodied.

I claim as my invention:

1. In a toy airplane, a motor for driving the propeller of the plane, a lifting rotor mounted on the plane to be lowered toward the plane, when not in use, and to be elevated into operative position above the plane, means for holding said rotor in its lowered position, and means, actuated by said motor, when its power is reduced, for releasing said holding means from said rotor to enable said rotor to rise above the plane into its operative position.

2. In a toy air plane, a motor for driving the propeller of the plane, said motor comprising a plurality of elastic bands connected at one end to the propeller shaft, a lifting rotor mounted on the plane to be lowered toward the plane when not in use, and to be elevated into operative position above the plane, and means, connected to the other end of said elastic bands, for holding said rotor in its lowered position, when said elastic bands are wound together, and for releasing said rotor when said bands unwind, to enable said rotor to rise above the plane into its operative position.

3. In a toy airplane, a motor for driving the propeller of the plane, said motor comprising a plurality of elastic bands connected at one end to the propeller shaft of the plane, a lifting rotor mounted on the plane to be lowered toward the plane, when not in use, and to be elevated into operative position above the plane, and a spring latch arm connected to the other end of said elastic bands for holding said arm, with its latch in engagement with said rotor, for holding said rotor in its lowered position, when said elastic bands are wound together, and for allowing said arm to swing back, under the influence of its spring, to withdraw its latch from said rotor, when said bands unwind, to enable said rotor to rise above the plane into its operative position.

4. In a toy airplane, a motor for driving the propeller of the plane, a pole upstanding from the plane, a stop on said pole, a rotor comprising a hub slidable on said pole, and a plurality of blades mounted on said hub, one of said blades being fixed on said hub and two of said blades being hinged to said hub to swing, one over and the other under said fixed blade, or to be swung into spaced operative relation to said fixed blade and to each other, means connected to said hinged blades for swinging said blades into said spaced relation and holding the same in such relation, means for holding said rotor in its lowered position on said pole, with its blades folded one-over-the-other, and means for releasing said holding means from said rotor, when the power of the propeller motor is reduced, for enabling said rotor to rise on said pole above the plane until the rotor hub engages said stop on said pole, where said hinged blades are swung into spaced relation with each other and with said fixed blade of the rotor.

5. In a toy airplane, a motor for driving the propeller of the plane, a foldable lifting rotor mounted on the plane to be lowered toward the plane and its blades folded one-over-the-other in its lowered position, and to be elevated above the plane into its operative position with its blades unfolded, means for engaging the outer end of one of the rotor blades for holding the rotor in its lower and folded position, and means for releasing said engaging means from said rotor blade, when the power of the propeller motor is reduced, for enabling said rotor to rise above the plane and unfold into its operative position.

JULIUS GOLDMAN.